(12) United States Patent
Amann et al.

(10) Patent No.: US 12,505,143 B2
(45) Date of Patent: Dec. 23, 2025

(54) TOPIC CLUSTERING AND EVENT DETECTION

(71) Applicant: Echobox Ltd, London (GB)

(72) Inventors: Antoine Amann, London (GB); Marc Fletcher, London (GB); Simon Tanné, London (GB)

(73) Assignee: Echobox Ltd, London (GB)

( * ) Notice: Subject to any disclaimer, the term of this patent is extended or adjusted under 35 U.S.C. 154(b) by 0 days.

(21) Appl. No.: 17/800,540

(22) PCT Filed: Feb. 12, 2021

(86) PCT No.: PCT/GB2021/050355
§ 371 (c)(1),
(2) Date: Aug. 18, 2022

(87) PCT Pub. No.: WO2021/165657
PCT Pub. Date: Aug. 26, 2021

(65) Prior Publication Data
US 2023/0088986 A1    Mar. 23, 2023

Related U.S. Application Data

(60) Provisional application No. 62/977,751, filed on Feb. 18, 2020.

(30) Foreign Application Priority Data

Feb. 18, 2020   (GB) ..................... 2002192

(51) Int. Cl.
*G06F 17/00*    (2019.01)
*G06F 7/00*    (2006.01)
*G06F 16/355*    (2025.01)
*G06Q 50/00*    (2012.01)

(52) U.S. Cl.
CPC .......... *G06F 16/355* (2019.01); *G06Q 50/01* (2013.01)

(58) Field of Classification Search
CPC .............................. G06F 16/355; G06Q 50/01
USPC ....................................................... 707/737
See application file for complete search history.

(56) References Cited

U.S. PATENT DOCUMENTS

| | | | | |
|---|---|---|---|---|
| 2002/0042793 A1* | 4/2002 | Choi | | G06F 16/353 |
| 2004/0177053 A1* | 9/2004 | Donoho | | G06Q 10/04 |
| | | | | 707/999.107 |
| 2005/0105712 A1* | 5/2005 | Williams | | G10L 13/027 |
| | | | | 704/275 |
| 2007/0156732 A1* | 7/2007 | Surendran | | G06Q 10/107 |
| 2009/0125916 A1* | 5/2009 | Lu | | G06Q 10/04 |
| | | | | 719/318 |
| 2013/0151525 A1* | 6/2013 | Ankan | | G06F 40/30 |
| | | | | 707/E17.089 |
| 2013/0346424 A1* | 12/2013 | Zhang | | G06F 16/313 |
| | | | | 707/750 |
| 2016/0371345 A1* | 12/2016 | Kostirev | | G06F 16/9535 |
| 2018/0219875 A1* | 8/2018 | Bania | | H04L 63/1425 |
| 2019/0012374 A1* | 1/2019 | Petroni | | G06F 9/542 |

(Continued)

*Primary Examiner* — Pavan Mamillapalli

(57) ABSTRACT

A device for identifying events based on a dataset comprising datapoints. The device comprises a clustering module configured to cluster the dataset into topic clusters; and a cluster cohesion filter module configured to filter datapoints in each topic cluster based on each datapoint's datapoint-to-cluster distance.

16 Claims, 15 Drawing Sheets

(56) References Cited

U.S. PATENT DOCUMENTS

| | | | | |
|---|---|---|---|---|
| 2023/0126317 A1* | 4/2023 | Millington | ............. | G01C 21/30 |
| | | | | 701/519 |
| 2023/0128788 A1* | 4/2023 | Millington | ......... | G01C 21/3605 |
| | | | | 701/533 |

* cited by examiner

TOPIC CLUSTERING AND EVENT DETECTION

RELATED APPLICATIONS

This application is a National Phase of PCT Patent Application No. PCT/GB2021/050355 having International filing date of Feb. 12, 2021, which claims the benefit of priority under 35 USC § 119 (e) of U.S. Provisional Patent Application No. 62/977,751 and United Kingdom Patent Application No. 2002192.9, both filed on Feb. 18, 2020. The contents of the above applications are all incorporated by reference as if fully set forth herein in their entirety.

FIELD AND BACKGROUND OF THE INVENTION

The present disclosure relates to a device and a method for extracting event(s) from a dataset and preferably outputting data indicative of the event(s). For example, the present disclosure could be used in the context of an electrical distribution system where the potential event(s) is a power failure. Data indicative of the event is outputted.

Events occur every day and in every aspect of our lives. Events can even result in hazardous or dangerous situations and automated identification of events can be of high importance to the safety of people involved.

Coupled with this is the increase of information sources and volume of data that devices, companies, and people are able to produce and/or consume. Information can come from a wide range of sources including sensors, news outlets, social media, user reports, statistical anomaly-based systems, and more.

When new data sources are introduced, new dimensionalities within the data can also be introduced. Increasing the number of dimensions in a dataset will often increase calculation complexity.

For example, faults occur in electrical distribution systems and power grids. Causes for the faults can come from a number of sources including downed power lines, overloaded transmission stations, overloaded power stations, individual consumers drawing too much power, circuit breakers tripping too early or too late, and fatigue and/or failure in any power distribution component. There are a number of data sources in current electric power distribution systems that can directly or indirectly identify these issues. Data sources can come from individual sensors on power distribution components (such as temperature sensors to indicate overloading), user reports of power lines falling down, user reports of power loss, AC frequency measured at different points in the system, power output measurements compared with threshold maximum power outputs. Occasionally these sensors can have faults including false positives, false negatives, or simply inaccurate data. Determining whether all this information coming from the various data sources relates to a contemporaneous event, are a result of noise, or relate to incidents that are not relevant at this current time currently is a difficult task.

The present disclosure seeks to overcome the problems outlined above.

BACKGROUND TO THE DISCLOSURE

Aspects of the disclosure are set out in the accompanying claims. An advantage of filtering out extraneous datapoints is in reducing the total amount of data being processed (thereby reducing total processing power required) and thereby providing a method and device to more effectively and efficiently identify events.

According to an aspect of the invention, there is provided a device for identifying event(s) based on a dataset comprising datapoints, comprising a clustering module configured to cluster the dataset into topic clusters; and a cluster cohesion filter module configured to filter datapoints in each topic cluster based on each datapoint's datapoint-to-cluster distance.

Optionally, the device is configured to provide information indicative of any identified event(s).

Optionally, the device is configured to receive a user provided corpus of works; and match user provided work(s) relating to any identified event(s).

Optionally, the device is configured to submit the matching work(s) to a social media account of the user on behalf of the user.

Optionally, the device is configured to obtain the dataset from a database operatively connected to the device.

Optionally, the cluster cohesion filter module is configured to filter out a datapoint if the datapoint's datapoint-to-cluster distance is over a threshold.

Optionally, the threshold is based on the datapoint with the next least datapoint-to-cluster distance.

Optionally, the threshold is based on the datapoint-to-cluster distance of the datapoint with the next least datapoint-to-cluster distance.

Optionally, the threshold is equal to the datapoint-to-cluster distance of the datapoint with the next least datapoint-to-cluster distance multiplied by a threshold multiplier.

Optionally, the threshold multiplier is between 1.05 and 1.7. Preferably, the threshold multiplier is between 1.07 and 1.5. More preferably, the threshold multiplier is between 1.09 and 1.3. Most preferably, the threshold multiplier is approximately 1.1.

Optionally, the cluster cohesion filter module is configured to filter out a datapoint if a datapoint's datapoint-to-cluster distance is higher than a datapoint's datapoint-to-cluster that has been filtered out.

Optionally, the cluster cohesion filter module is configured to determine datapoint-to-cluster distance for each datapoint within the topic cluster.

Optionally, determining datapoint-to-cluster distance for each datapoint comprises: temporarily removing a datapoint from the cluster to create a new temporary cluster; determining the centre of the new temporary cluster; determining the distance between the temporarily removed datapoint and the new temporary cluster centre; and repeating the process for each datapoint in the cluster.

Optionally, the distance between the datapoint and a topic cluster centre is determined using cosine similarity.

Optionally, the cluster cohesion filter module is further configured to sort the datapoints by their datapoint-to-cluster distance.

Optionally, the cluster cohesion filter is further configured to compare adjacent datapoints in the sorted set of datapoints and if the difference in datapoint-to-cluster distances between the adjacent points is over a threshold then the datapoint with a higher datapoint-to-cluster distance is filtered out of the cluster.

Optionally, if a datapoint is filtered out then all datapoints with a higher datapoint-to-cluster distance are filtered out.

Optionally, the threshold is between 5 percent and 20 percent of the lower valued datapoint-to-cluster distance. Preferably, the threshold is between 7 percent and 15 percent of the lower valued datapoint-to-cluster distance. More preferably, the threshold is between 9 percent and 13 percent of the lower valued datapoint-to-cluster distance. Most preferably, the threshold is approximately 10 percent of the lower valued datapoint-to-cluster distance.

Optionally, further comprising a temporal feature module configured to determine, based on a temporal feature of the topic cluster, whether each topic cluster is related to an event.

Optionally, the temporal feature module is further configured to determine a time property for each datapoint and determining the number of datapoints that have their time property within a time window.

Optionally, determining whether each topic cluster is related to an event based on a temporal feature of the topic cluster comprises is based on whether a number of datapoints in the time window is above a threshold amount.

Optionally, the threshold amount is between 50 percent and 95 percent of the topic cluster size. Preferably, the threshold amount is between 60 percent and 90 percent of the topic cluster size. More preferably, the threshold amount is between 70 percent and 85 percent of the topic cluster size. Most preferably, the threshold amount is approximately 80 percent of the topic cluster size.

Optionally, the time property is the time the datapoint was published.

Optionally, the time window is adjustable.

Optionally, the time window is between 2 and 48 hours long. Preferably, the time window is between 4 and 24 hours long. More preferably, the time window is between 6 and 18 hours. Most preferably, the time window is approximately 12 hours long.

Optionally, the time window ends at the current time.

Optionally, the cluster cohesion filter module operates on the clusters after they have been processed by the temporal feature module.

Optionally, the event is a breaking news event.

Optionally, the datapoints are news articles.

Optionally, the clustering is hierarchical clustering. Preferably the clustering method is hierarchical agglomerative clustering (HAC).

Optionally, the topics for topic clustering are determined using term frequency-inverse document frequency (TF-IDF).

Optionally, the clustering module is configured to cluster using the terms extracted using term frequency-inverse document frequency.

Optionally, the clustering module is configured to cluster using metadata of the datapoints.

Optionally, the clustering module is configured to not cluster based on any temporal features of the datapoint. Preferably, the clustering module is configured to not cluster based on a publish date of the datapoint.

Optionally, the clustering module is configured to generate lowly cohesive clusters.

Optionally, the device is a server.

According to an aspect of the invention, there is provided a method of identifying event(s) based on a dataset comprising datapoints, comprising steps of clustering the dataset into topic clusters; and filtering datapoints in each topic cluster based on each datapoint's datapoint-to-cluster distance.

According to an aspect of the invention, there is provided a computer program product for identifying event(s) based on a dataset when executed by a computer processor, cause the computer processor to carry out any aspect described herein.

According to an aspect of the invention, there is provided a device for identifying for identifying event(s) based on a dataset, comprising a processor configured to undertake the method according to any aspect described herein.

It can also be appreciated that the methods can be implemented, at least in part, using computer program code. According to another aspect of the present disclosure, there is therefore provided computer software or computer program code adapted to carry out these methods described above when processed by a computer processing means. The computer software or computer program code can be carried by computer readable medium, and in particular a non-transitory computer readable medium. The medium may be a physical storage medium such as a Read Only Memory (ROM) chip. Alternatively, it may be a disk such as a Digital Video Disk (DVD-ROM) or Compact Disk (CD-ROM). It could also be a signal such as an electronic signal over wires, an optical signal or a radio signal such as to a satellite or the like. The disclosure also extends to a processor running the software or code, e.g. a computer configured to carry out the methods described above.

Each of the aspects above may comprise any one or more features mentioned in respect of the other aspects above.

Use of the words "server", "device", "processor", "communication interface", "module" and so on are intended to be general rather than specific. Whilst these features of the disclosure may be implemented using an individual component, such as a computer or a central processing unit (CPU), they can equally well be implemented using other suitable components or a combination of components. For example, they could be implemented using a hard-wired circuit or circuits, e.g. an integrated circuit, using embedded software, and/or software module(s) including a function, API interface, or SDK. Further, they may be more than just a singular component. For example, a server may not only include a single hardware device but also include a system of microservices or a serverless architecture. Either of which are configured to operate in the same or similar way as the singular server is described.

It should be noted that the term "comprising" as used in this document means "consisting at least in part of". So, when interpreting statements in this document that include the term "comprising", features other than that or those prefaced by the term may also be present. Related terms such as "comprise" and "comprises" are to be interpreted in the same manner. As used herein, "(s)" following a noun means the plural and/or singular forms of the noun.

It should be noted that the term "distance" as used in this document is intended to be used to be general rather than specific. Distance does not necessarily relate to any particular physical feature(s) or mathematical method(s). Distance can be considered a representation of similarity (or inverse similarity). Example distance measurement techniques used in the specification include Cosine similarity, Euclidian distance, and Manhattan distance. These are provided as examples of ways to measure distance or similarity. Other ways to determine and represent distances or similarities are also possible.

The invention extends to methods and/or apparatus substantially as herein described and/or as illustrated in the accompanying drawings.

The invention extends to any novel aspects or features described and/or illustrated herein. In addition, device aspects may be applied to method aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

As used herein, means plus function features may be expressed alternatively in terms of their corresponding structure, such as a suitably programmed processor and associated memory, for example.

BRIEF DESCRIPTION OF THE SEVERAL VIEW OF THE DRAWINGS

Figure 11:
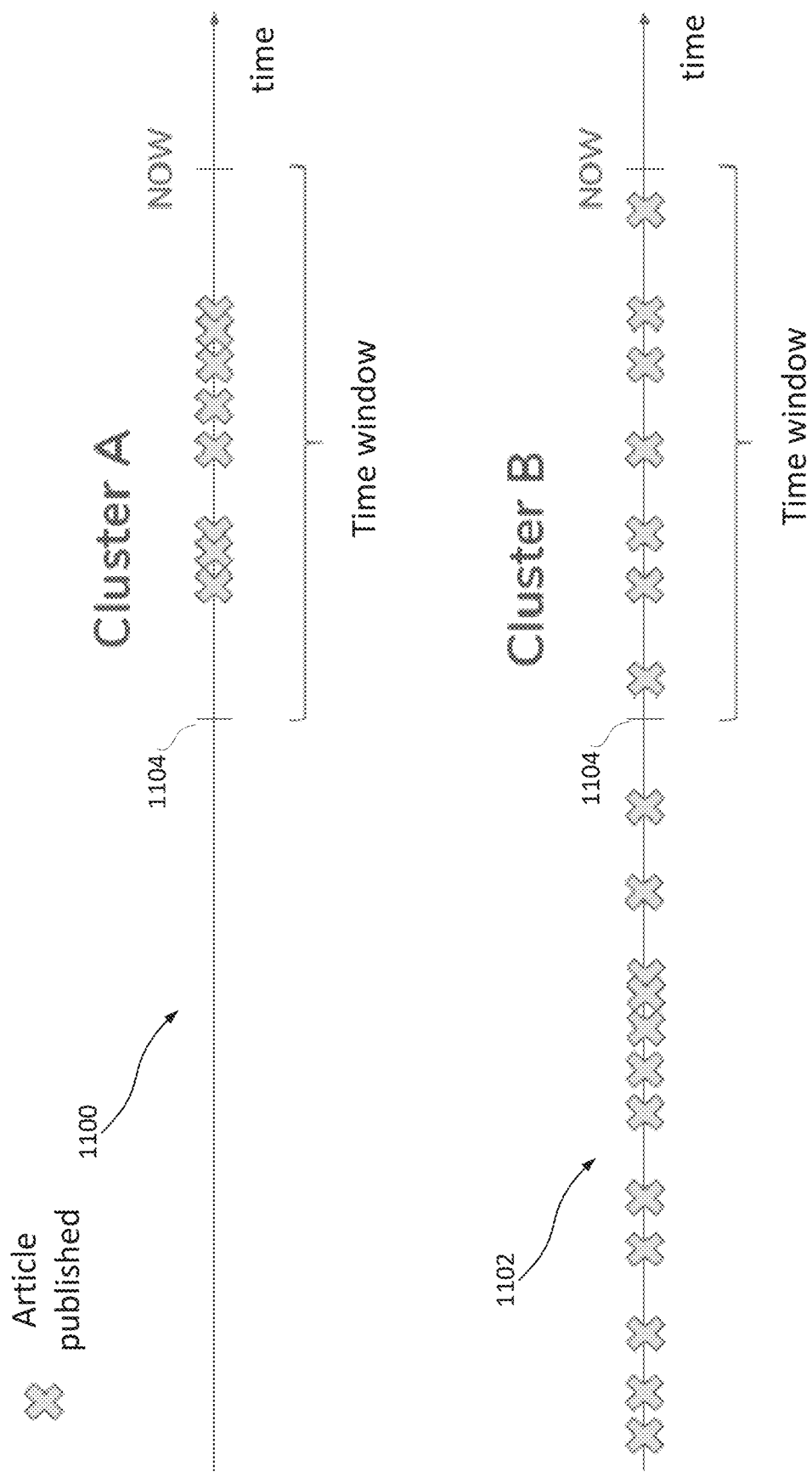

FIG. 11 has two timelines showing articles according to when they were published.

Figure 12:
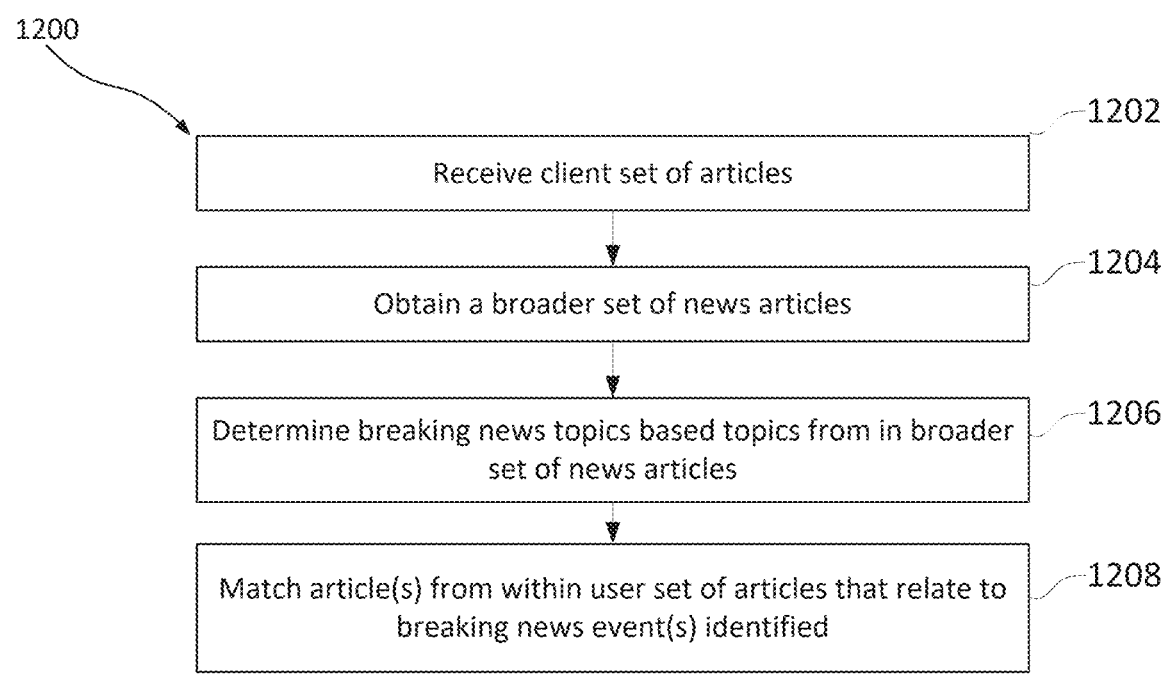

FIG. 12 is a flow diagram illustrating a method of matching articles according breaking news topics.

DESCRIPTION OF SPECIFIC EMBODIMENTS OF THE INVENTION

Figure 1:
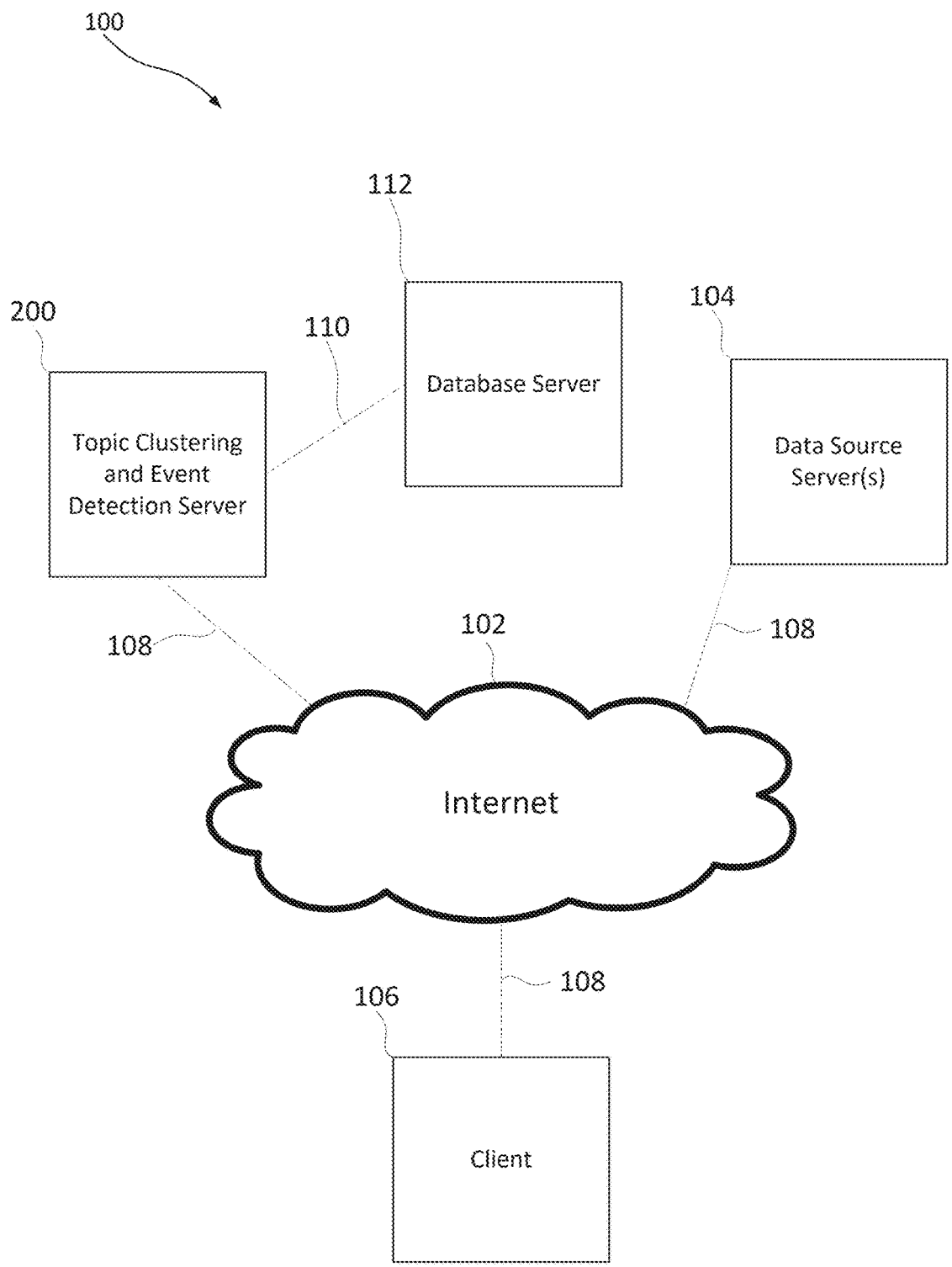
FIG. 1 is a schematic diagram of a communication network according to a preferred embodiment of the disclosure.

Referring to FIG. 1, in a communication network 100 a topic clustering and event detection server 200 is in communication with at least one data source server 104 and a client 106 is shown. The communication between the topic clustering and event detection server 200 and client 106 and data source server(s) 104 is made through the Internet 102 via communication links 108. The communication links 108 are standard Internet connections. Example communication links 108 are Ethernet connections to a router (not shown) and the router is connected to the Internet 102. The topic clustering and event detection server 200 is presented here as an example and the topic cluster and event detection can equally be undertaken on any device with the same or similar components as the server 200.

The topic clustering and event detection server 200 is connected to the data source server(s) 104 to obtain data for topic clustering. The data is aggregated into datasets and stored into a database stored on a database server 112. The topic clustering and event detection server 200 is connected to the database server 112 directly via connection 110. Optionally, the database server is connected to over the Internet 102. The database server 112 in this example database server is a NoSQL server such as MongoDB. Alternatively the database server 112 is a relational database server such as PostgreSQL.

The client 106 is connectable to the topic clustering and event detection server 200 so that the client can provide their own datasets to the topic clustering and event detection server 200.

Figure 2:
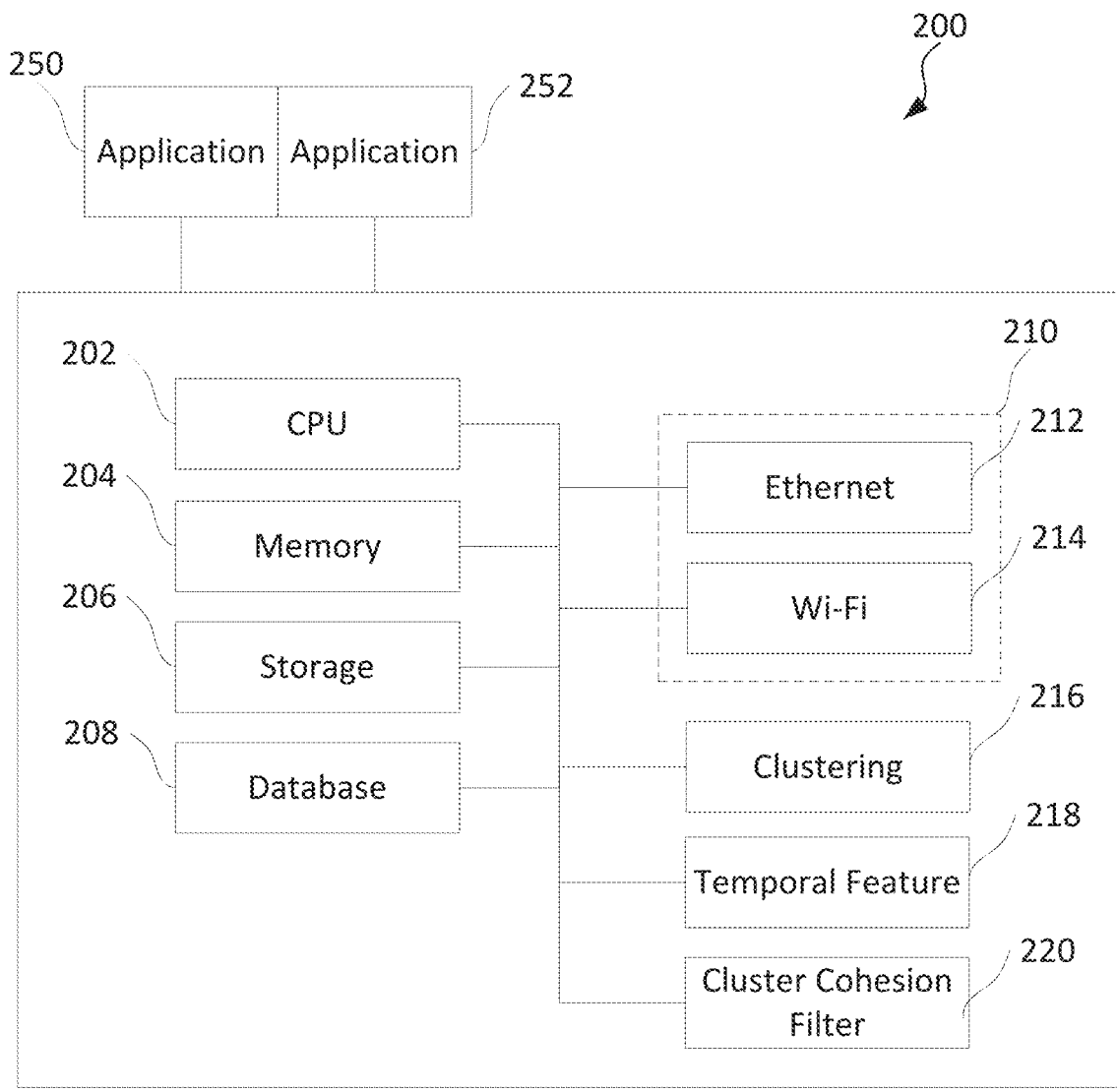
FIG. 2 is a schematic diagram of a topic clustering and event detection device.

Referring to FIG. 2, the topic clustering and event detection server 200 comprises a Central Processing Unit (CPU) 202, memory 204, storage 206, database module 208, communication interface 210 (comprising an Ethernet module 212 and optionally a Wi-Fi module 214) in communication with one another via a communication bus.

The CPU 202 is a computer processor, e.g. a microprocessor. It is arranged to execute instructions, e.g. in the form of computer executable code, and to process data, e.g. in the form of values and strings, including instructions and data stored in the memory 204 and the storage 206. The instructions and data executed by the CPU 202 include instructions for coordinating operation of the other components of the server 200, such as instructions and data for controlling the communication interface 210.

The memory 204 is implemented as one or more memory units providing Random Access Memory (RAM) for the server 200. In the illustrated embodiment, the memory 204 is a volatile memory, for example separate from the CPU 202. However, in other embodiments, the memory 204 is an on-chip RAM integrated with the CPU 202 using System-on-Chip (SoC) architecture. The memory 204 is arranged to store the instructions and data executed and processed by the CPU 202. Typically, only selected elements of the instructions and data are stored by the memory 204 at any one time, which selected elements define the instructions and data essential to the operations of the server 200 being carried out at the particular time. In other words, the instructions and data stored transiently in the memory 204 whilst some particular process is handled by the CPU 202.

The storage 206 is provided integrally with the server 200, in the form of a non-volatile memory. The storage 206, in most embodiments, is a hard drive. Alternatively the storage 206 is embedded on the same chip as the CPU 202 and the memory 204, using SoC architecture, e.g. by being implemented as a Multiple-Time Programmable (MTP) array. In further alternative embodiments, the storage 206 is an embedded or external flash memory, or such like. The storage 206 stores the instructions and data executed and processed by the CPU 202. The storage 206 stores the instructions and data permanently or semi-permanently, e.g. until overwritten. That is, the instructions and data are stored in the storage 206 non-transiently. Typically, the instructions and data stored by the storage 206 relates to instructions fundamental to the operation of the CPU 202, communication interface 210, and the server 200 more generally, including modules 216, 218, 220, and applications 250, 252 performing higher-level functionality of the server 200.

The communications interface 210 supports making and receiving connections to the Internet 102 usually via an Ethernet connection to an Internet connected router (not shown).

The database module 208 in the present example is configured to establish a connection to an external database server 112. The database module 208 comprises hardware and/or software components that are required to establish said connection. Alternatively the database module 208 is only software and uses the hardware components already present on the server 200. In a further alternative, the database is running on the server 200 itself and the database module 208 is configured to manage inter-process communication with said database software. The inter-process communication may be TCP/IP. In a further alternative, the database module 208 is software library configured to manage the database itself such as a SQLite database and associated libraries. A person skilled in the art will appreciate that there are a number of different database setups and an even greater number of ways to connect to said database setups.

The server 200 is configured to run a plurality of software modules. The software modules include an operating system. The operating system is an embedded or a real time operating system. Such operating systems are optimised to reduce delays and to allow for a better user experience. The operating system manages the basic functioning of the hardware of the server and operational interactions between the hardware components of the server and software modules.

The application 250 is configured to run the method(s) 300, 350 as described with reference to FIG. 3A and/or FIG. 3B. Another application 252 is an HTTP server configured to serve an interface to clients wanting to access details such as topics that relate to breaking news as determined by the application 250. The interface is in the form of a HTML website and/or API.

The server 200 further comprises a clustering module 216, a temporal feature extraction module 218, and a cluster cohesion module 220. These modules are software modules, but alternatively are hardware modules, or modules to communicate with other APIs on the server or remotely to undertake the same tasks.

The clustering module 216 is configured to receive datasets to be clustered and cluster them. Optionally, the clustering module 216 clusters datapoints into topic clusters according to the method as described with reference to FIGS. 5 to 8. Optionally, the clustering module also does topic extraction as described with reference to FIG. 4.

The temporal extraction module 218 is configured to operate the temporal feature extraction as described below with reference to FIG. 11.

The cluster cohesion filter module 220 is configured to operate the cluster cohesion filtering as described below with reference to FIG. 9A to 10B.

Figure 3A:
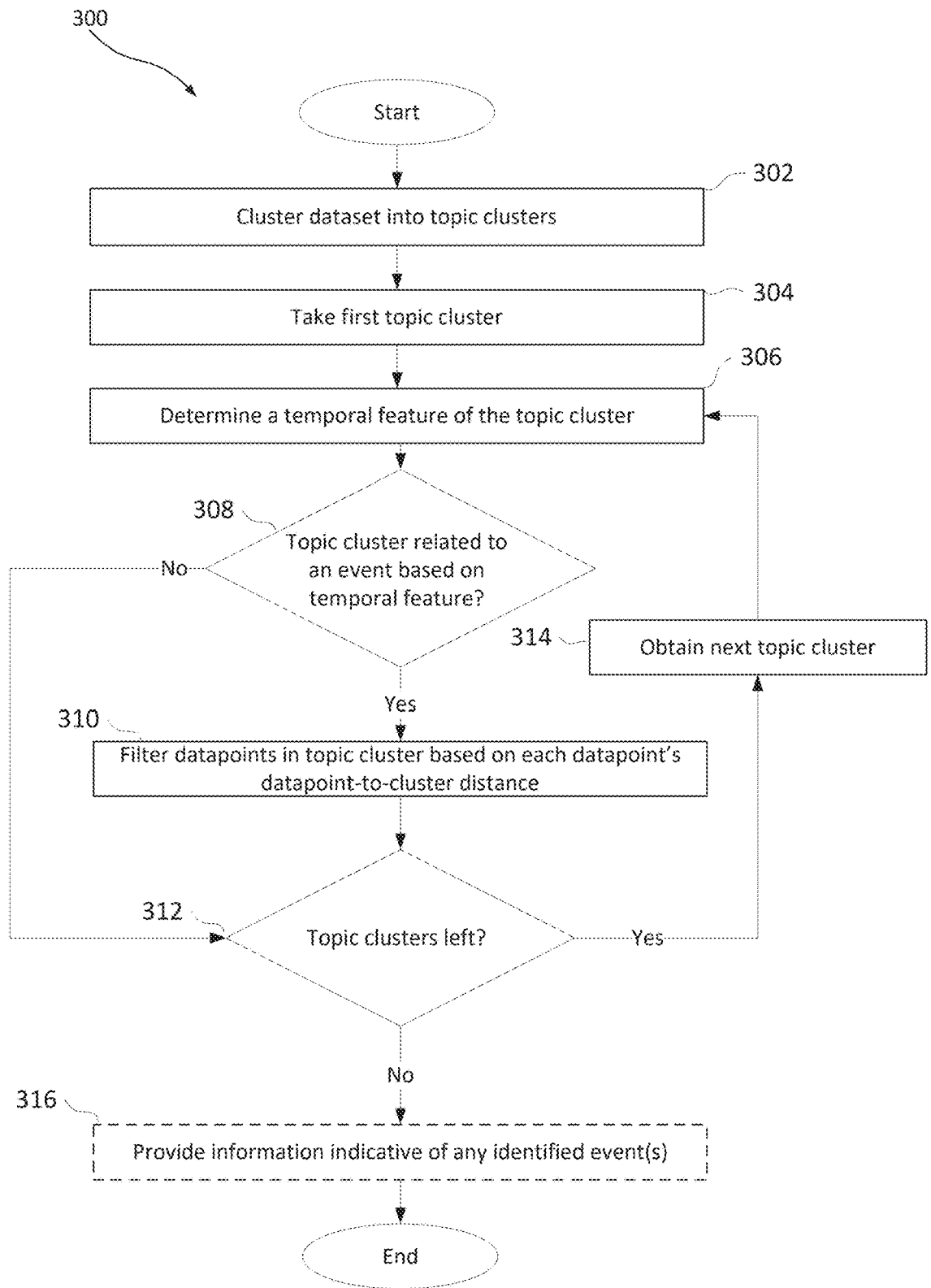
FIGS. 3A and 3B are flow diagrams illustrating methods of topic clustering and event detection.

Referring to FIG. 3A, a method 300 of event identification is shown using topic clustering. This method 300 is configured to be run on a topic clustering and event detection server 200.

The dataset has already been received by the server and is ready to be processed at the start of this method 300. The data is optionally obtained from database using the database module 208. The datapoints within the dataset are clustered 302 into topic cluster in the first step. Optionally, the datapoints are already clustered and this step is not undertaken. With the datapoints clustered, each topic cluster is analysed to determine 308 whether the cluster relates to an event and then filtered 310. This method 300 is presented a loop iterating over each cluster one after the other using the looping steps 304, 312, 314. Alternatively, each cluster is processed concurrently and the results are collected after all are processed.

A temporal feature is determined 306 determined for each cluster. The temporal feature is used to determine 308 whether the topic cluster is related to an event. Preferably, if the topic cluster is not related to an event based on the temporal feature, any further processing of the cluster is skipped. The temporal feature is described in greater detail with reference to FIG. 11.

The further processing includes filtering 310 the cluster's datapoints based on the datapoints' datapoint-to-centre distance. The filtering is described in greater detail with respect to FIGS. 9A to 10B.

Optionally, data indicative of the topic clusters that relate to an event and/or data indicative of the event are provided 316 for a user or other process to consume.

By way of an example, the method and system described in FIGS. 1 to 3A are used for faults within an electrical distribution system. In this example, a potential event is an electrical fault and the dataset is the output of sensors on electrical distribution components, user reports of brown-outs and power outages, AC frequency measurements taken from different parts of the power distribution network, power outputs (in particular compared with power output maximums) from power stations and or power distribution components. This power related data is collected and clustered 302. Example clustering methods for types of data include the balanced iterative reducing and clustering using hierarchies (BIRCH) method. Depending on the type of data received, the dataset may need to be further annotated and/or some sensor fusion may need to be applied before feeding into a clustering algorithm.

Methods of filtering and temporal feature determination are described herein with reference to FIGS. 6 to 11. While the examples used make reference to a "publishing time" of news articles, a person skilled in the art will appreciate that this can apply to when a piece of data is measured by a sensor or recorded by a user.

Figure 3B:
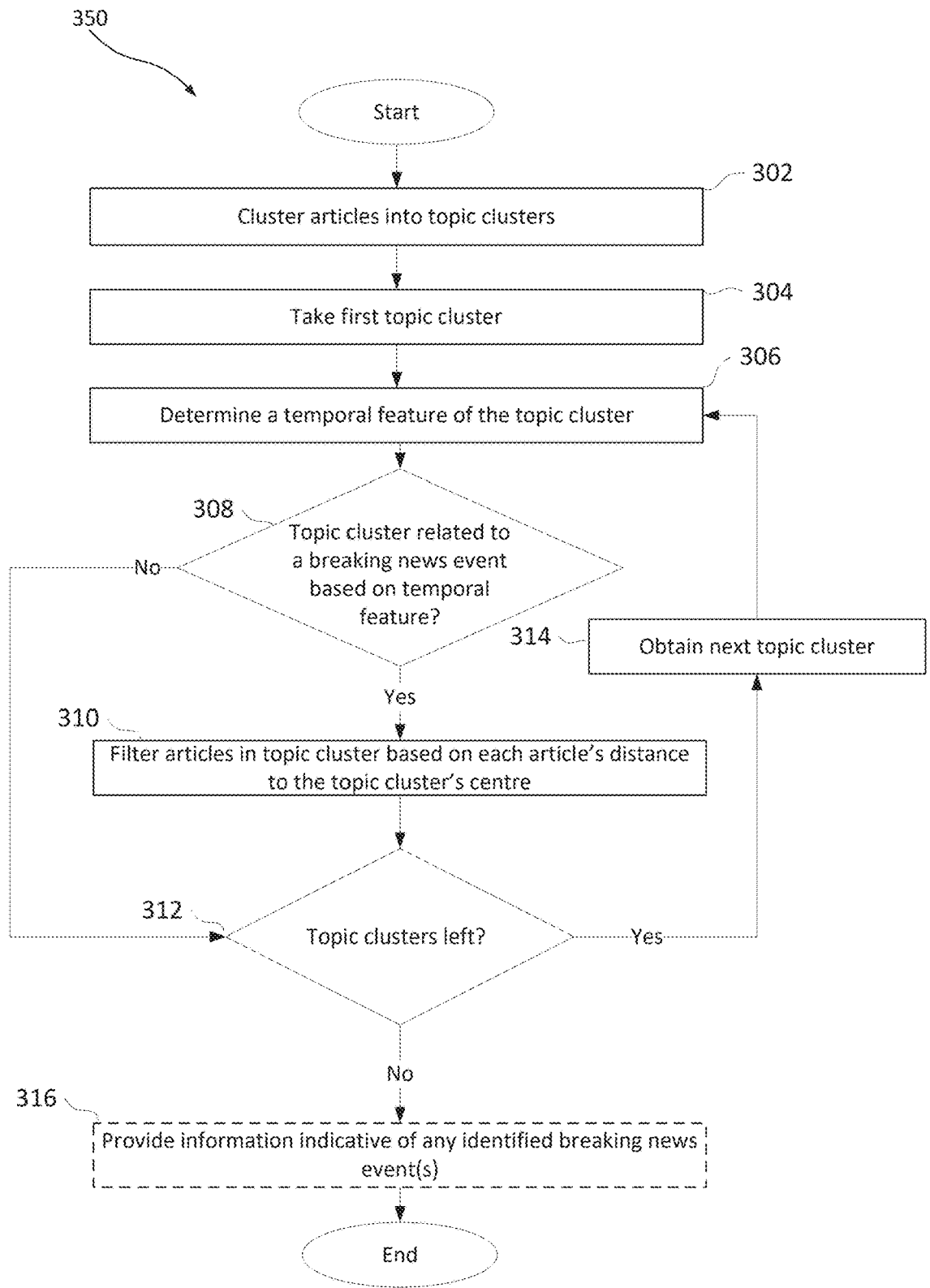

The method 350 of FIG. 3B is described with reference to a breaking news detection method. The method 350 of topic clustering and event determination is the same as the method 300 described with reference to FIG. 3A except specifically relating to news articles and detecting breaking news. The same reference numerals have been used in FIG. 3B as in FIG. 3A as the method steps are performing substantially the same or similar actions except acting on different data.

The dataset as a collection of news articles and the events as breaking news events are used by way of example only throughout the remainder of the specification. A person skilled in the art will appreciate that the methods, devices, and systems described herein may be used for other text based systems or non-text based systems beyond breaking news and electrical fault detection.

Clustering

Figure 4:
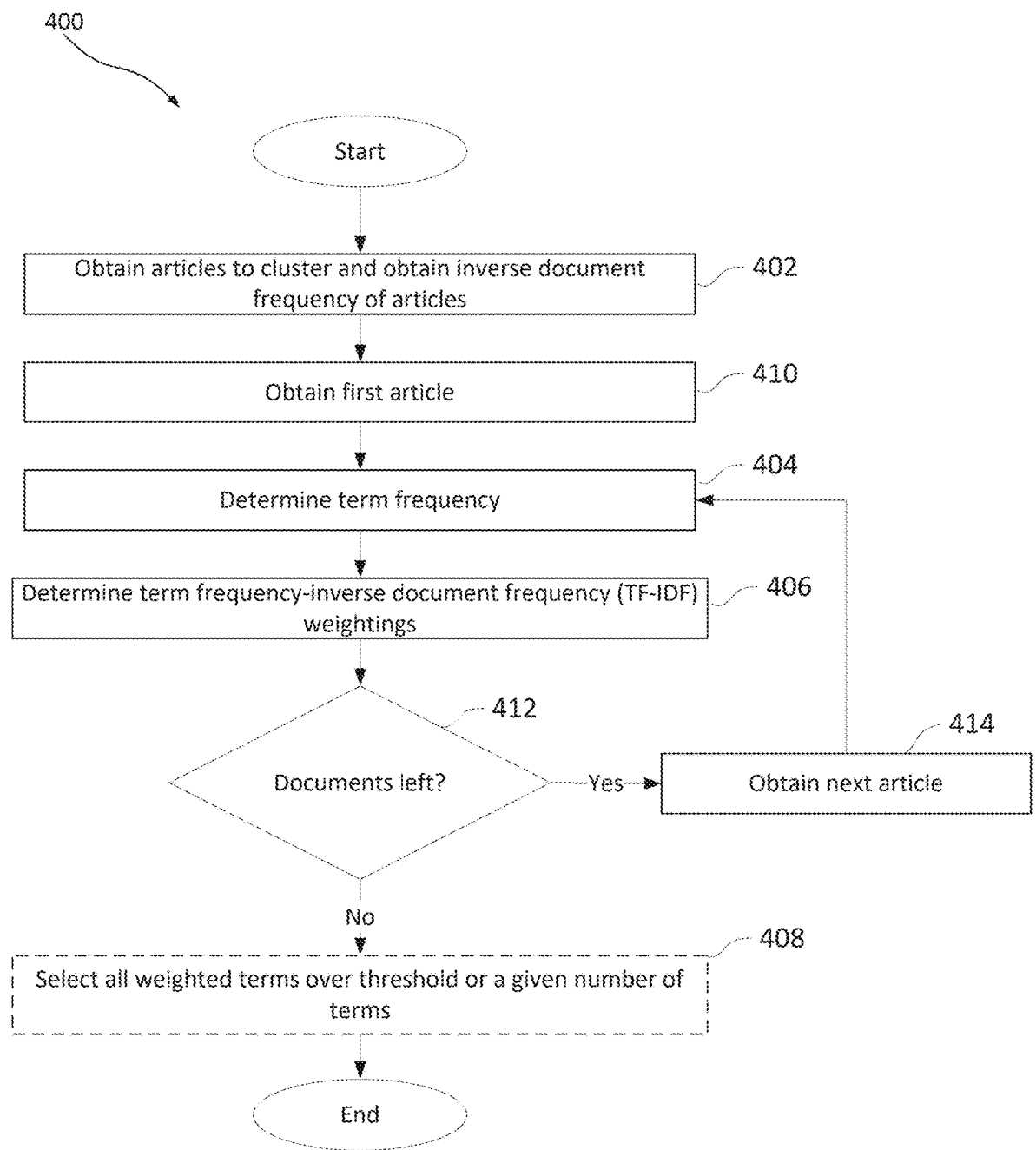
FIG. 4 is a flow diagram illustrating a method of topic extraction.

Referring to FIG. 4, a method 400 of identifying and extracting key words and/or phrases within documents is shown. In particular, term frequency-inverse document frequency (TF-IDF) is used. TF-IDF is a numerical statistic that reflects how important a word is to an article across the total set of articles to be analysed. Advantageously, TF-IDF will provide stop-word filtering thereby reducing some (if any) of article pre-processing. The set of articles to be analysed is obtained 402 which optionally has the inverse document frequency already calculated. If the inverse document frequency has not been calculated, then it will be calculated.

For each article, term frequency is determined 404 and weighted 406 by the inverse document frequency. The method 400 shown here uses a loop 410, 412, 414 to go over each article iteratively. Optionally, the processing 404, 406 of each article may be run in parallel or concurrently.

Each word can provide a dimension for clustering. High dimensional clustering can be very computationally expensive. In the simplest case, the number of dimensions is equal to the dictionary size. Dimensionality reduction is optionally used to reduce the number of dimensions. Another way to limit the number of dimensions is to, with all of the words across all of the articles weighted, select 408 all words with a weighting over a certain threshold. By selecting words that are over a certain threshold of importance, the number and relevance of the words can be tuned to allow for finer grained control over how computationally intensive the remaining of the clustering steps need to be. Alternative to selecting words that are over a given threshold of importance is to select a given amount of the most important words. Similar to selecting over a threshold, a customisable number of important words (i.e. dimensions) will again provide flexibility and control over computational complexity.

These extracted weighted words will provide different dimensions for articles to be compared to and potentially clustered around.

Other features of the articles may also be used as dimensions, for example the geographic location of the author and/or publishing service, the author, any categories or tags the article has attached, and/or any other metadata available.

Figure 5:
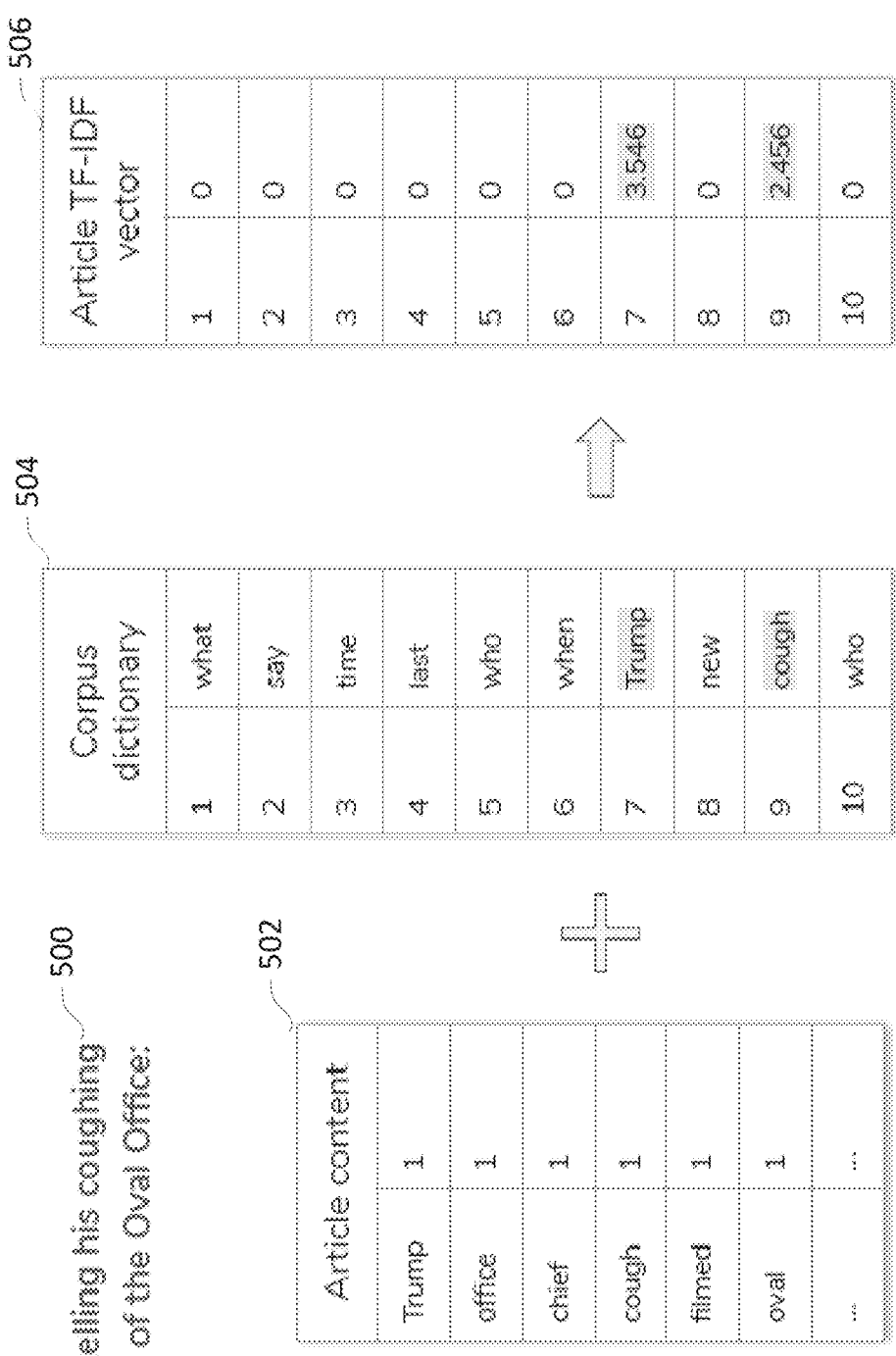
FIG. 5 is a diagram illustrating term frequency-inverse document frequency vector generation.

Referring to FIG. 5, a simplified illustrative example is shown where the article is only the sentence "Trump filmed angrily telling his coughing chief of staff to get out of the Oval Office: 'you just can't cough'". The frequency of words in the article content is calculated and given in the Article content table 502. The Corpus dictionary table 504 is already generated and inverse document frequency values have been calculated (but not shown here). The final weighted values are shown in the Article TF-IDF vector table 506 show that the words Trump and Cough are highly important words for this article compared with the corpus dictionary. At least these two words will later be used as two dimensions that other articles may be clustered around if they also have the same words with similar importance.

Optionally, the clustering module 216 is configured extract terms according to the method 400 as described with reference to FIG. 4.

Figure 6:
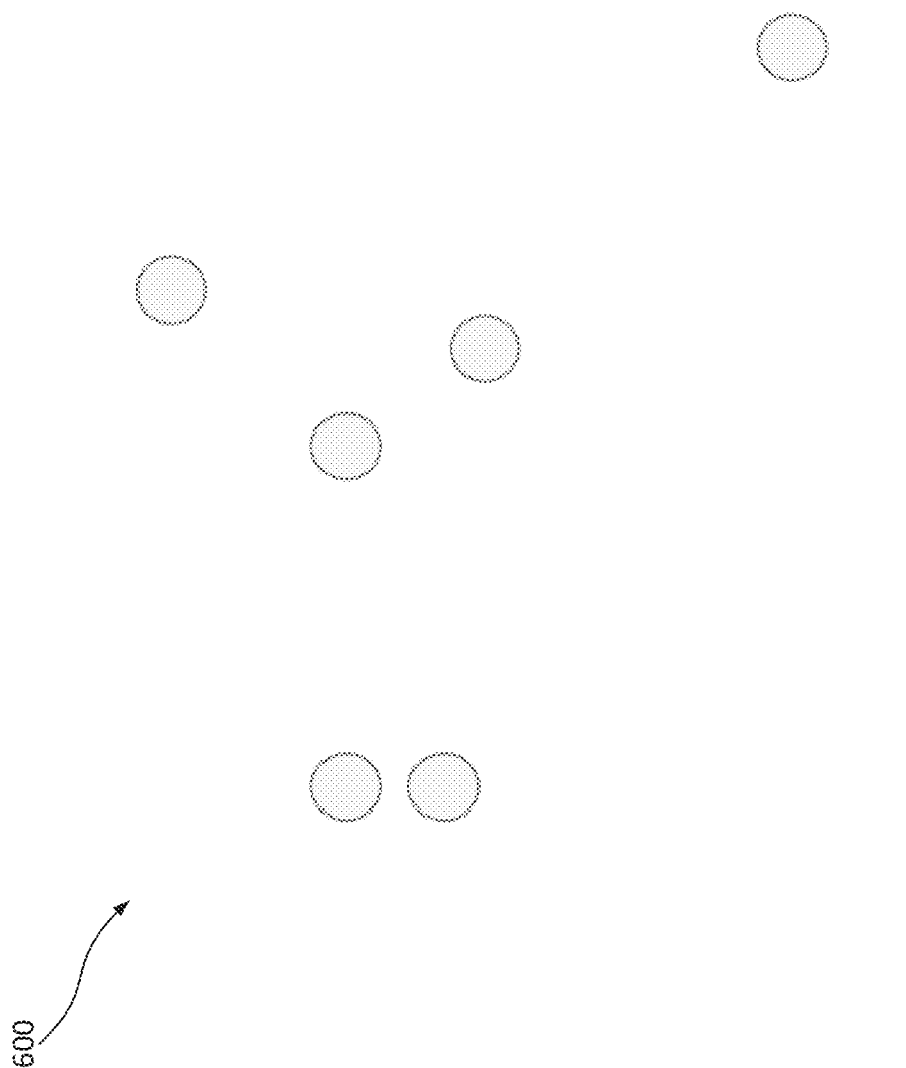
FIG. 6 is a diagram illustrating a set of datapoints.
Figure 7:
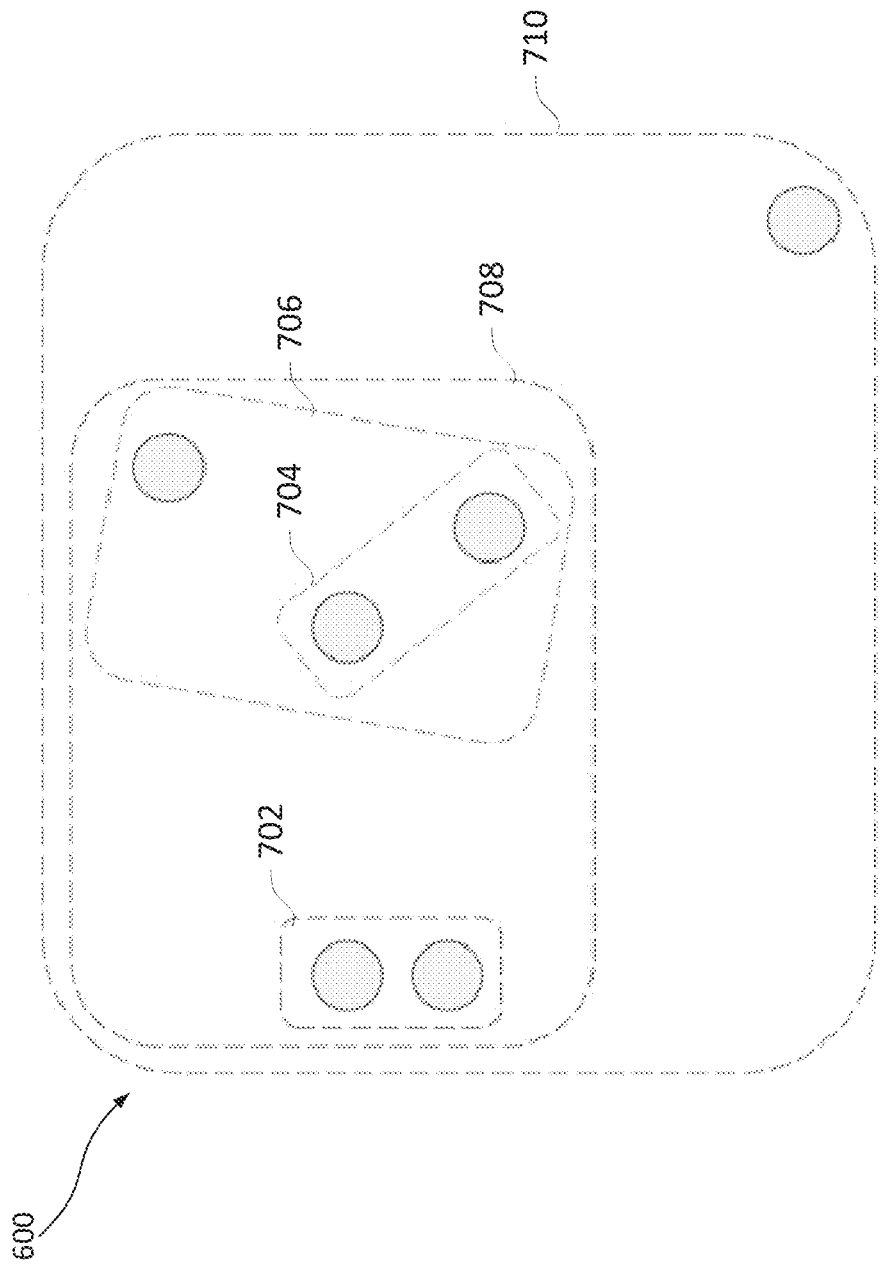
FIGS. 7 and 8 are diagrams illustrating a set of datapoints that have been hierarchically clustered.

Referring to FIG. 6, a set of articles 600 which have been processed according to the method 500 of FIG. 5 is shown. To simplify and illustrate the set of articles 600, they are presented on a 2D plane. In reality, a much larger number of dimensions would be used. The articles 600 are then clustered into topic clusters. Hierarchical agglomerative clustering (HAC) has been used. The same set of articles 600 is clustered into hierarchical topic clusters 702, 704, 706, 708, 710 as shown in FIG. 7. The hierarchical clusters 702, 704, 706, 708, 710 go from narrow or small clusters 702, 704 of just two articles that are similar, then to broader clusters 706, 708 and finally a single root cluster that contains all the articles 710.

Figure 8:
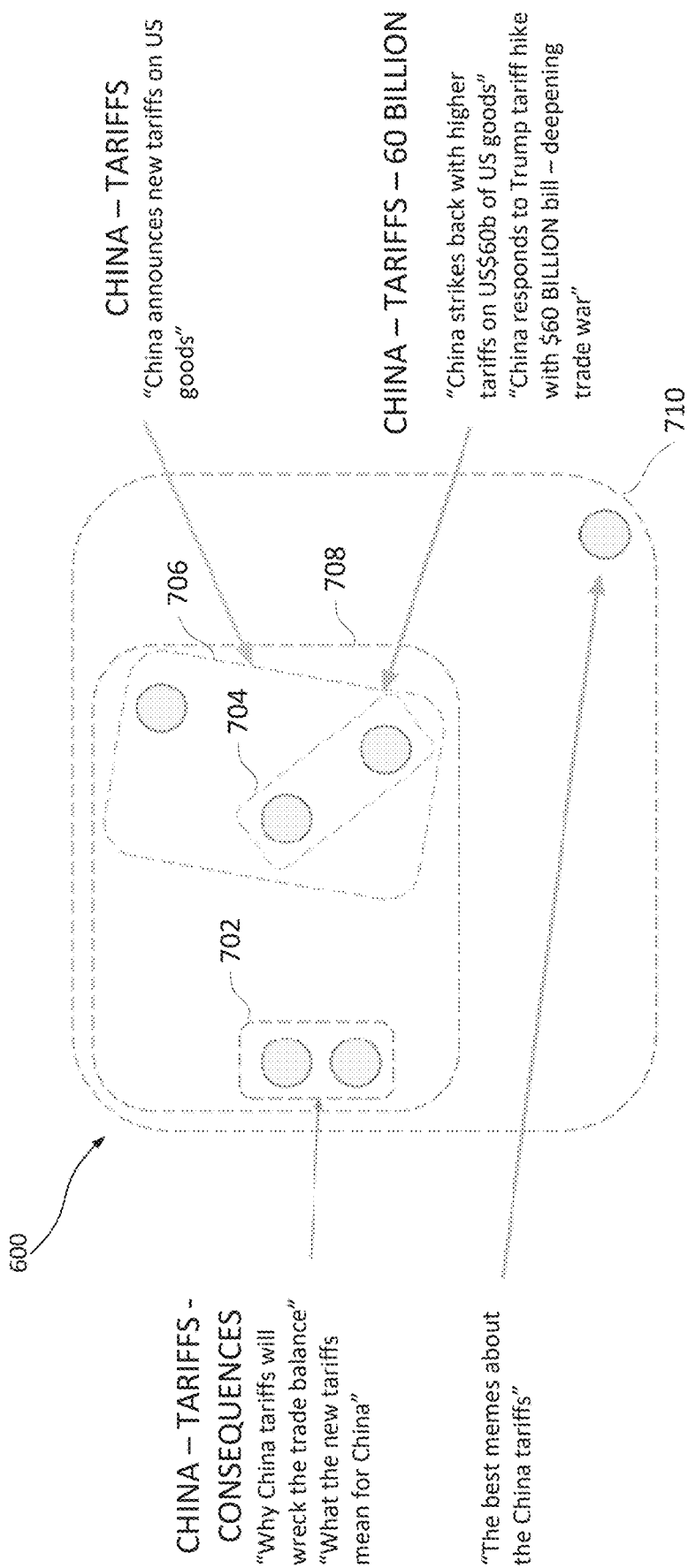

Referring to FIG. 8, the same set of articles 600 have been annotated to show the title of each article and broadly what each cluster 702, 704, 706, 708, 710 is about. Articles in cluster 704 relate to similar ideas around China, Tariffs, and 60 Billion. Articles in the broader parent cluster 706 relate to just China and Tariffs. As is expected, the broader parent clusters have fewer specific descriptors. Some of these clusters 702, 704, 706, 708, 710 relate to breaking news and some are evergreen articles.

Alternatively, other clustering methods are used such as k-means.

Optionally, the clustering method as described above does not use any time related information in the clustering. The time related information is later used in the method as described with reference to FIG. 11.

As there is no prior knowledge of what articles would result from any given event, the clustering methods are configured to create loosely cohesive clusters. If there are articles published that relate to an event, they necessarily have a constrained distribution of posting times. The constraint being between a given unknown time (the time at which the event occurred), and the current time (the time at which the methods described herein are undertaken). This constrained distribution is at odds with the motivation to create loosely cohesive clusters.

Temporal Feature

If a topic cluster relates to an event then datapoints within that topic cluster should be published within a time window. The presence and number of the datapoints being within a time window is a temporal feature of the topic cluster. Preferably, the majority of the datapoints of a topic cluster must be published within the time window for the topic cluster to be considered relating to an event. More preferably, the number of datapoints of a topic cluster published within the time window must be over a threshold amount. Preferably the threshold amount is relative to the size of the cluster. More preferably, the threshold amount is 80 percent of the size of the cluster.

Generally, we are concerned with contemporaneous events. As such the time window ends at the current time and starts one time window length before the current time.

Returning to the article and breaking news example, if a cluster contains only articles about a breaking news event, then the publish times of the articles will only be published after the breaking news event occurred. Additionally, if a cluster contains only articles about a breaking news event, then the publish times of the articles will come soon after the breaking news event. This closeness in time (or lack thereof) is a temporal feature of the topic cluster.

Referring to FIG. 11, two example timelines 1100, 1102 are shown with articles plotted on them. Articles are represented by the 'x' symbols. The timeline 1100 for Cluster A shows a standard posting timeline of a breaking news event. The articles are clustered closely, within a time window and all after a given event time 1104. The timeline 1102 for Cluster B shows a posting timeline of a cluster that does not relate to a breaking news event. The articles are not clustered closely to each other time wise and are outside of a time window. More than 80 percent of the articles have been posted outside of the time window and therefore the Cluster B does not relate to a breaking news event.

The time window is between 2 and 48 hours, and preferably between 4 and 24 hours, and more preferably between 6 and 18 hours and most preferably approximately 12 hours.

The length of the time window is adjustable depending on the timescale of the events that are wanting to be detected. For example, bigger news events may be in the news for longer periods of time and as such a longer time window may be used.

The time window is used because an exact time of an event is not known beforehand. The time window aims to capture any event that may have happened during the given time window length. While the example timeline 1100 of FIG. 11 shows a breaking news example where the articles are posted at the start of the window, this is not always the case for all events every time. More likely is that the event occurred after the start of the time window but before the publication time of the first article.

Filtering clusters based on this temporal feature as early in the process as possible is advantageous as it has a low cost operation compared with most other cluster related operations. In particular, it is clear that the temporal feature is only based on one dimension of the data: time published. Most other cluster related filtering or processing steps use a higher number of dimensions. In particular, the cluster cohesion steps discussed with reference to FIGS. 9A to 10B use a higher number of dimensions, optionally excluding time related dimension(s). The number of dimensions can extend into the hundreds or even thousands. With the number of dimensions that high, even calculating distances between points can be computationally intensive.

Cluster Cohesion Filtering

With clusters formed, there will likely be some clusters that contain breaking news articles about one single event and some clusters that contain articles about one single event along with articles of the same or similar broad topic. A cluster that contains a lot of articles about one single event will have articles that are very close together. Conversely, in a cluster that contains a lot of articles about one single topic, the articles that are about the broad topic (i.e. not a single breaking news topic or event) will be further apart from the cluster centre.

The clusters that contain articles about one single event along with articles of the same or similar broad topic can obscure what could potentially be a very tight and well defined breaking news event. To get a better determination of what the specific event is, not what the event is broadly related to, the articles within the topic cluster may need to be filtered out if they are not cohesive enough with the core, breaking news event.

After the filtering process as described with reference to FIGS. 9A to 10B is concluded on a given broad cluster, a highly cohesive cluster remains. A highly cohesive cluster will more likely relate to a single event and not include other articles vaguely related to the same topic.

Referring to FIGS. 9A, 9B, 10A, and 10B, an example method of determining the cohesion of articles within the topic cluster is described and filtering based on the cohesion features. In particular, the articles then are filtered to remove any that are too distant from the topic cluster centre. As mentioned above, the cluster cohesion filter module 220 is configured to run the method described below with reference to FIGS. 9A, 9B, 10A, and 10B.

Figure 9A:
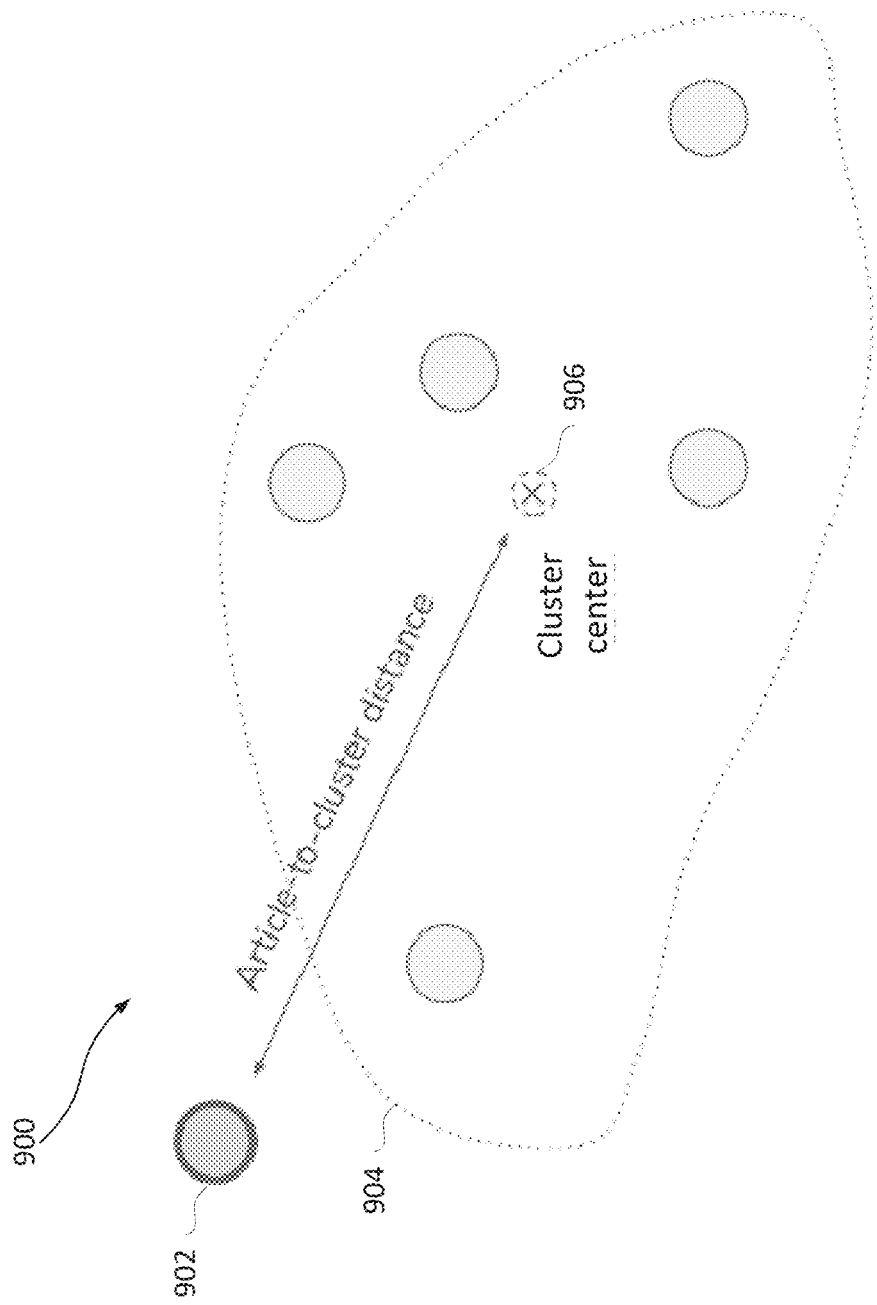
FIGS. 9A and 9B illustrate a method of determining article-to-cluster distances.
Figure 9B:
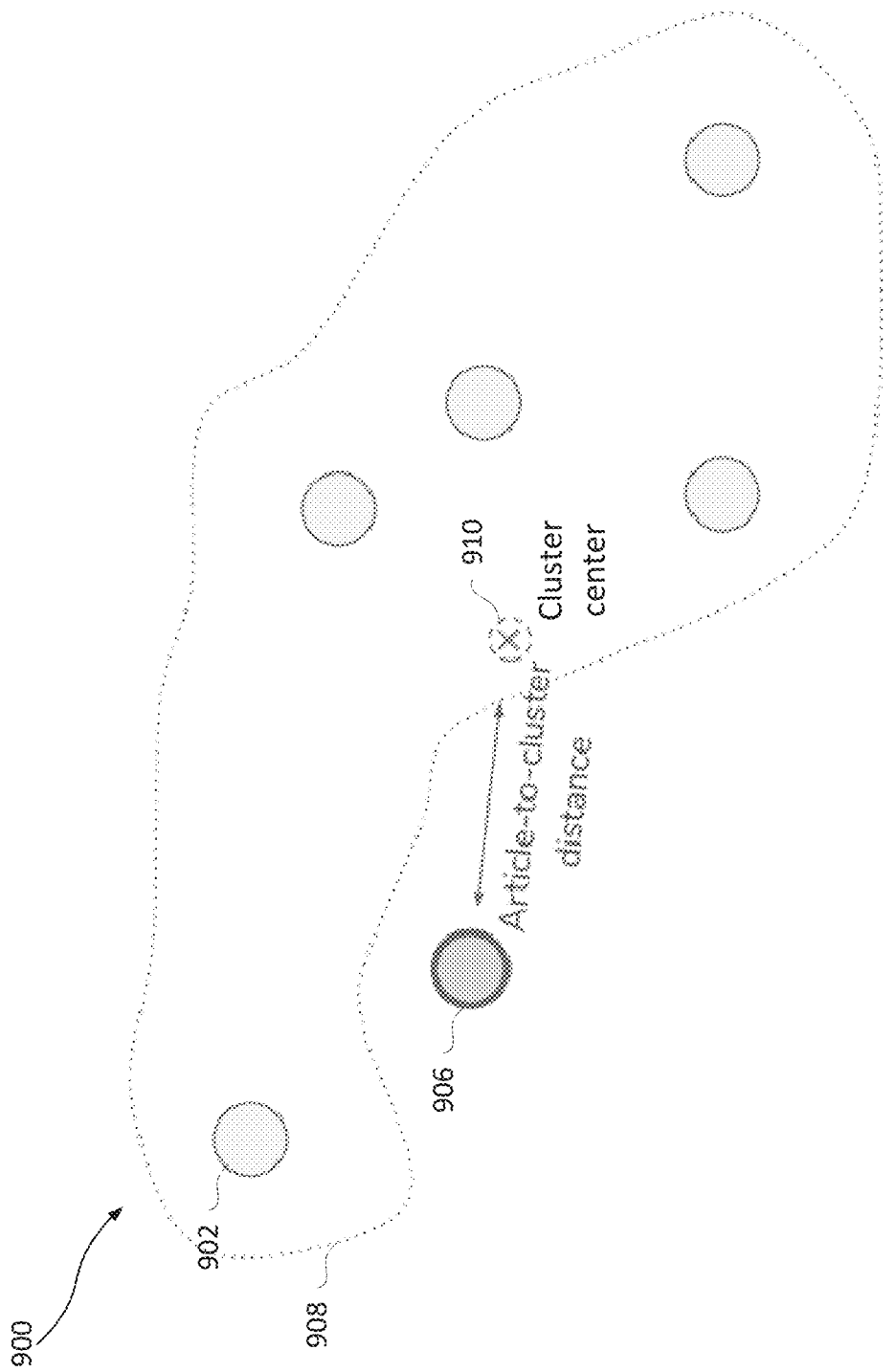

Taking the cluster 900 shown in FIGS. 9A and 9B as an example cluster, an article-to-cluster distance is measured for each article in the cluster 900. To measure the article-to-cluster distance, an article is removed from the cluster, the centre of the new temporary cluster is calculated, and finally the distance between the removed article and the new centre of the temporary cluster. With reference to FIG. 9A, the article 902 is shown removed from the new temporary cluster 904. The new temporary cluster 904 is depicted with a dashed line. The new centre 906 of the temporary cluster 904 is calculated. The article-to-cluster distance is calculated using cosine similarity. Alternative methods to calculate distance include Euclidian distance or Manhattan distance. These steps are repeated for all articles in the cluster.

For illustrative purposes and with reference to FIG. 9B, the process is shown again using the same cluster 900 but taking a different article 906 out. The article 902 has been added back into the cluster, and a different article 906 has been removed. The new temporary cluster 908 has its centre 910 calculated and the article-to-cluster distance is calculated between the new centre 910 and the removed article 906.

Figure 10A:
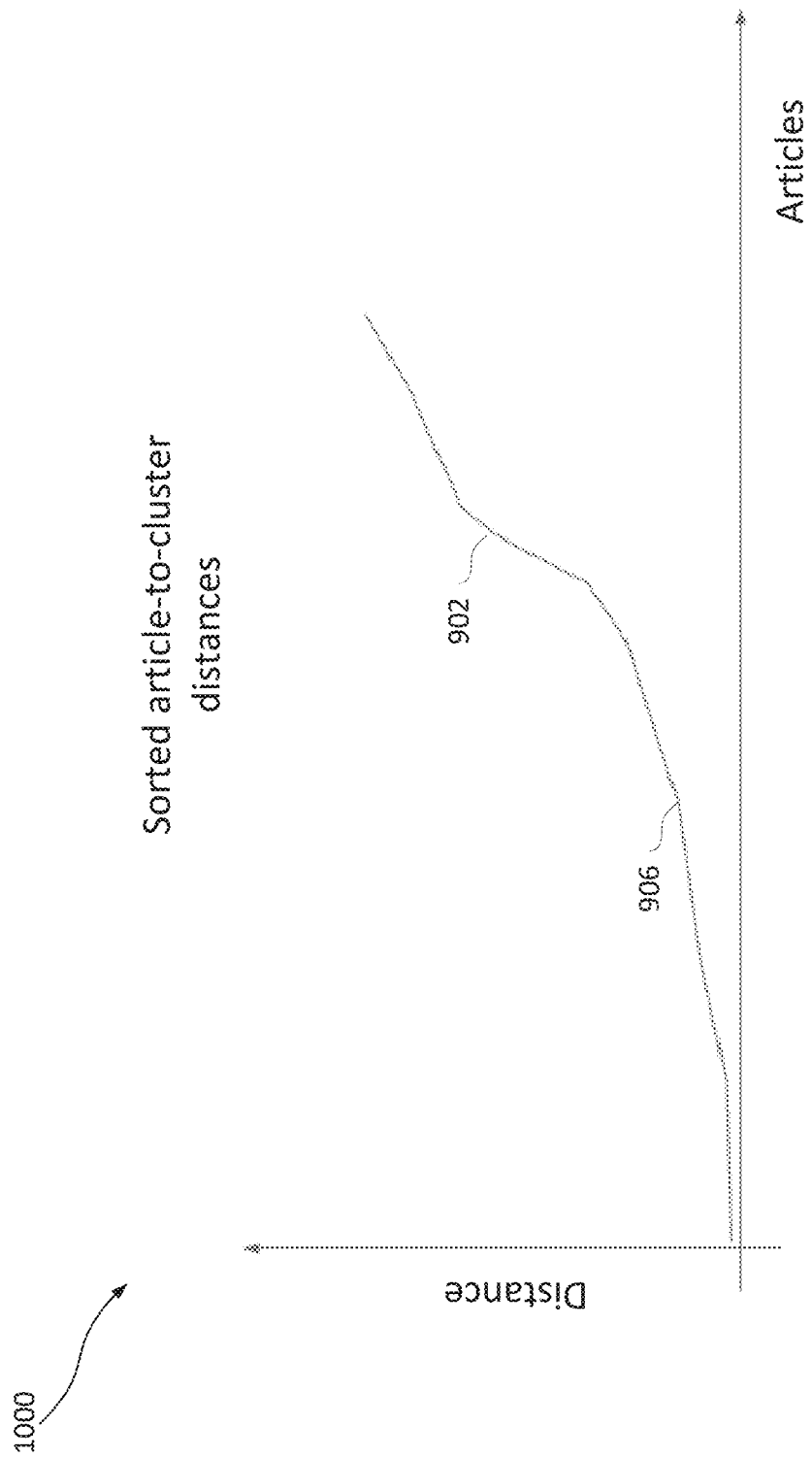
FIG. 10A is a plot of articles according to their article-to-cluster distances.
Figure 10B:
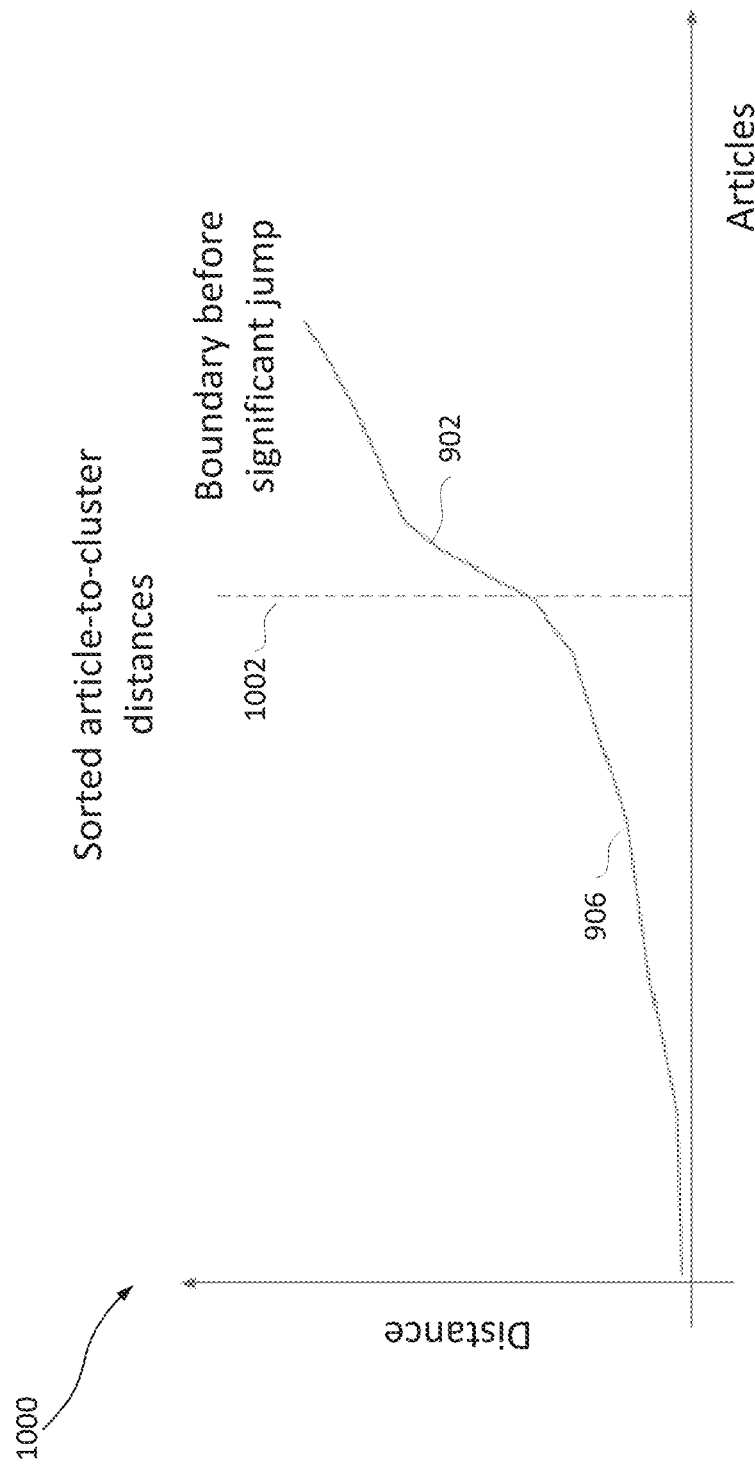
FIG. 10B is a plot of articles according to their article-to-cluster distances including a mark where a jump in article-to-cluster distances has been identified.

Referring to FIGS. 10A and 10B, all of the articles in the cluster 900 have been sorted by their article-to-cluster distance and plotted on a graph 1000. This plot shows how cohesive the cluster is. In particular, the graphs of FIGS. 10A and 10B show that roughly the half of the articles have quite low article-to-cluster distances (and therefore these articles can be described as being quite cohesive), while the other have quite high article-to-cluster distances.

As shown in FIG. 10B, a significant increase labelled by the dashed line 1002 can be seen in the plot about half way through the sorted articles.

In this example, a significant increase is between 5 percent and 20 percent (and preferably 10 percent) from one article to the next. This significant increase threshold may be customised depending on the articles sources to ensure appropriate articles are removed from the cluster.

Also shown in FIGS. 10A and 10B are the approximate locations of the articles 902, 906 discussed with reference the cluster 900 of FIGS. 9A and 9B. The first article 902 is shown after the boundary 1002 as it has a higher article-to-cluster distance. The second article 906 is shown before the boundary 1002 as it is more cohesive with a lower article-to-cluster distance.

Described alternatively, an article is considered not cohesive enough with the cluster if the article's article-to-cluster distance is greater than the next closest article's article-to-cluster distance multiplied by a threshold multiplier. In particular, the threshold is determined by starting from the lowest article-to-cluster distance and moving to the next lowest article-to-cluster distance comparing it the previous.

As such, an article is filtered out if the article's article-to-cluster distance is higher than an article's article-to-cluster that has already been filtered out.

The threshold multiplier is between 1.05 and 1.20 (and preferably is equal to 1.1) as mentioned above and correlates directly with the 5 percent and 20 percent (and preferably 10 percent) increase being considered "significant". All articles with an article-to-cluster distance greater than the removed article's article-to-cluster distance are removed.

Output

Optionally, once the topic clusters that are related to breaking news have been identified and processed, an indication of what event(s) is/are occurring is provided to a user and/or other process. The event(s) can be provided in the form of a website for the user to view, or via API access from the topic clustering and event detection server 200. The event(s) may also be outputted to other internal processes such as the recommendation engine as discussed below.

The information indicative of what event(s) are is/occurring may be in the form of a list of the articles in the topic clusters that are determined to relate to a breaking news event, or may be a selection of the key words that are shared between the articles within the topic cluster.

Recommendation Engine

Optionally, the topic clustering and event detection server 200 also comprises a recommendation engine. The recommendation engine is configured to run the method as described with reference to FIG. 12. The recommendation engine receives 1202 a corpus of documents from a user or client 106. The corpus of documents in the example presented here is a set of articles that the client 106 has produced that may relate to breaking news that the client wishes to share in a timely manner.

The client articles are either already tagged with the topics that they relate to, or are analysed using any one or more of the methods as previously described with reference to FIGS. 3 to 8 to determine the topics.

A larger corpus of articles that other sources are publishing is obtained 1204. This larger corpus is analysed according method 350 described with reference to FIG. 3B such that the breaking news topics are identified.

The recommendation engine matches 1208 client article(s) with topic(s) that have been identified as breaking news and provides this recommendation to the client. Alternatively, the recommendation engine is configured to directly submit any articles that match a breaking news topic to client selected social media platforms such as Twitter™, Facebook™, and Instagram™.

Input or Data Gathering

Many of the methods and systems described herein involve analysis of a large collection of contemporaneous text-based news articles. 50,000 to 80,000 articles are usually analysed at any one time. These news articles are obtained from a number of sources including scraping news websites, API access to news providers, RSS feeds of news sources, and/or provided by clients 106.

Other types of news sources are optionally used such as video sources (from TV for example), audio sources (from radio stations for example), or similar. These additional sources can be used by converting the audio into text via speech to text technology. Alternatively or additionally the scripts and/or subtitle information for said audio or video based sources are used.

Data Preparation and Sanitisation

If the source of the gathered data is not properly pre-processed or cleaned, then accurate text extraction may not be possible and/or the TF-IDF may not output relevant topics. Text pre-processing may include any one or more of the following: stripping of HTML tags, removal of stop words, language determination and optionally translation if required, tokenisation, normalisation, noise removal (where noise includes extra white spaces or other irrelevant grammar), appropriate handling of Unicode characters (or other special characters), removal/expansion of contractions, removal of lower case, and/or stemming.

The described embodiments of the invention are only examples of how the invention may be implemented. Modifications, variations and changes to the described embodiments will occur to those having appropriate skills and knowledge. These modifications, variations and changes may be made without departure from the scope of the claims.

The invention claimed is:

1. A device for identifying event(s) based on documents comprising terms, the device comprising:
    a processor;
    a non-transitory computer readable memory storing software code which, when executed on the processor, causes the processor:
        to extract the terms from the documents;
        to cluster the documents into topic clusters based on a term frequency-inverse document frequency (TF-IDF) calculated from the extracted terms;
        to filter documents in each topic cluster based on each document's document-to-cluster distance; and
    a temporal feature module configured to determine, based on a temporal feature of the topic cluster, whether each topic cluster is related to an event and to determine whether each topic cluster is related to an event by determining a time property for each document and determining the number of documents that have their time property within a time window.

2. The device according to claim 1, wherein the device is configured to:
    provide information indicative of any identified event(s).

3. The device according to claim 1, wherein the device is configured to:
    receive a user provided corpus of works; and
    match user provided work(s) relating to any identified event(s).

4. The device according to claim 3, wherein the device is configured to:
    submit the matching work(s) to a social media account of the user on behalf of the user.

5. The device according to claim 1, wherein the cluster cohesion filter module is configured to filter out a document if the document's document-to-cluster distance is over a threshold.

6. The device according to claim 5, wherein the threshold is based on the document with the next least document-to-cluster distance.

7. The device according to claim 6, wherein the threshold is based on the document-to-cluster distance of the document with the next least document-to-cluster distance.

8. The device according to claim 7, wherein the threshold is equal to the document-to-cluster distance of the document with the next least document-to-cluster distance multiplied by a threshold multiplier.

9. The device according to 1, wherein the cluster cohesion filter module is further configured to:
    sort the documents by their document-to-cluster distance.

10. The device according to claim 9, wherein the cluster cohesion filter is further configured to compare adjacent documents in the sorted set of documents and if the difference in document-to-cluster distances between the adjacent points is over a threshold then the document with a higher document-to-cluster distance is filtered out of the cluster.

11. The device according to claim 10, wherein the threshold is between 5 percent and 20 percent of the lower valued document-to-cluster distance.

12. The device according to claim 11, wherein determining whether each topic cluster is related to an event based on a temporal feature of the topic cluster comprises is based on whether a number of documents in the time window is above a threshold amount.

13. The device according to claim 12, wherein the threshold amount is between 60 percent and 95 percent of the topic cluster size.

14. The device according to claim 13, wherein the time window is between 2 and 48 hours long.

15. The device according to claim 1, wherein the event is a breaking news event.

16. The device according to claim 1, wherein the documents are news articles.

* * * * *